(12) United States Patent  
Wallin

(10) Patent No.: US 9,589,140 B2  
(45) Date of Patent: Mar. 7, 2017

(54) DIGITAL ASSET AUTHENTICATION SYSTEM AND METHOD

(75) Inventor: Lars Wallin, Vallentuna (SE)

(73) Assignee: ARLINGTON TECHNOLOGY HOLDINGS LIMITED, London (GB)

( * ) Notice: Subject to any disclaimer, the term of this patent is extended or adjusted under 35 U.S.C. 154(b) by 791 days.

(21) Appl. No.: 13/639,658

(22) PCT Filed: Mar. 8, 2011

(86) PCT No.: PCT/GB2011/000327  
§ 371 (c)(1),  
(2), (4) Date: Apr. 16, 2013

(87) PCT Pub. No.: WO2011/124873  
PCT Pub. Date: Oct. 13, 2011

(65) Prior Publication Data  
US 2013/0198863 A1    Aug. 1, 2013

(30) Foreign Application Priority Data

Apr. 6, 2010   (GB) .................................. 1005733.9  
Nov. 16, 2010  (GB) .................................. 1019390.2

(51) Int. Cl.  
G06F 7/04      (2006.01)  
G06F 21/60     (2013.01)  
G06F 21/10     (2013.01)

(52) U.S. Cl.  
CPC .............. *G06F 21/60* (2013.01); *G06F 21/10* (2013.01)

(58) Field of Classification Search  
CPC .................................................. G06F 21/604  
(Continued)

(56) References Cited

U.S. PATENT DOCUMENTS 5,982,891 A    11/1999  Ginter et al.  
8,225,391 B2 *  7/2012  Labaton ................ H04L 9/0863  
                                                 380/255  
(Continued)

FOREIGN PATENT DOCUMENTS

WO    WO 00/30323 A2    5/2000

OTHER PUBLICATIONS

Lin et al., "A New Non-intrusive Authentication Approach for Data Protection Based on Mouse Dynamics," Biometrics and Security Technologies (ISBAST), 2012 International Symposium on Year: 2012 pp. 9-14.*

(Continued)

*Primary Examiner* — Roderick Tolentino  
(74) *Attorney, Agent, or Firm* — Patterson Thuente Pedersen, P.A.

(57) ABSTRACT

The invention provides a digital asset authentication system and method. The invention includes a digital asset metadata register storing details of parties enrolled with the system, including at least one end user and at least one digital asset supplier, and details of digital assets available from the digital asset supplier. A security module is provided for producing a unique tag and for creating a digital asset security container for the tag comprising data relating to events involving the tag, and the tag and the security container are stored in a store. A processor executes authentication software in response to a request from said one end user for a respective digital asset to validate the request by reference to the metadata register to verify that the metadata register lists said one end user and the respective digital asset. In response to a valid request, the processor firstly causes the security module to produce the tag and to create the security container containing data relating to the end user, the digital asset request and the digital asset, and (Continued)

secondly generates a message for said one end user including the tag and authorizing release of said digital asset for download, play or use.

23 Claims, 18 Drawing Sheets

(58) Field of Classification Search
  USPC .............................. 380/200–205; 726/26–30
  See application file for complete search history.

(56) References Cited

U.S. PATENT DOCUMENTS

| | | | | |
|---|---|---|---|---|
| 8,996,421 | B2* | 3/2015 | Kahn | G06F 21/10 705/59 |
| 2003/0005427 | A1 | 1/2003 | Herrero | |
| 2004/0010602 | A1 | 1/2004 | Van Vleck et al. | |
| 2005/0039034 | A1* | 2/2005 | Doyle | H04L 9/0825 713/193 |
| 2005/0102527 | A1* | 5/2005 | Tatebayashi | G06F 21/10 713/189 |
| 2005/0235361 | A1* | 10/2005 | Alkove | G06F 21/10 726/27 |
| 2006/0095854 | A1* | 5/2006 | Funk | H04N 7/17336 715/749 |
| 2006/0167855 | A1* | 7/2006 | Ishikawa | G06F 17/30106 |
| 2008/0118061 | A1* | 5/2008 | Yang | H04N 7/1675 380/200 |
| 2009/0254997 | A1* | 10/2009 | Yassa | G06F 21/10 726/27 |
| 2010/0312810 | A1* | 12/2010 | Horton | G06F 17/30749 707/812 |

OTHER PUBLICATIONS

Sreenivas et al., "Performance evaluation of encryption techniques and uploading of encrypted data in cloud," Computing, Communications and Networking Technologies (ICCCNT),2013 Fourth International Conference on Year: 2013 pp. 1-6.*
International Search Report from International Application No. PCT/GB2011/000327dated Jul. 26, 2011, 3 pages.

* cited by examiner

DIGITAL ASSET AUTHENTICATION SYSTEM AND METHOD

RELATED APPLICATIONS

The present application is a National Phase entry of PCT Application No. PCT/GB2011/000327, filed Mar. 8, 2011, which claims priority from Great Britain Application No. 1005733.9, filed Apr. 6, 2010, and Great Britain Application No. 1019390.2, filed Nov. 16, 2010, the disclosures of which are hereby incorporated by reference in their entireties.

FIELD OF THE INVENTION

The present invention concerns a digital asset authentication system and method for ensuring the secure validation and release of a digital asset, in the form of a digital file, from a digital asset distributor and/or digital asset owner to an end user.

SUMMARY OF THE INVENTION

According to one aspect of the present invention, there is provided a digital asset authentication system comprising a digital asset metadata register storing details of parties enrolled with the system, including at least one end user and at least one digital asset supplier, and details of digital assets available from the digital asset supplier; a security module for producing a unique tag and for creating a digital asset security container for the tag comprising data relating to events involving the tag; a store for the tag and the security container; and a processor for executing authentication software in response to a request from said one end user for a respective digital asset to authenticate the request by reference to the metadata register to verify that the metadata register lists said one end user and the respective digital asset, and in response to an authentic request firstly to cause the security module to produce the tag and to create the security container containing data relating to the end user, the digital asset request and the digital asset, and secondly to generate a message for said one end user including the tag and authorizing release of said digital asset.

Preferably, the security module includes a random value generator and a clock facility, and the unique tag produced by the security module comprises a random string and an associated time value.

Advantageously, said request includes a transaction reference and the processor further executes the authentication software to generate a digital asset release key by encrypting the transaction reference and by causing the security module to seed the encrypted transaction reference with a random string and an associated time value, and wherein the release key is included in said message.

According to another aspect of the present invention, there is provided a method for digital asset authentication comprising: storing in a metadata register details of parties enrolled for digital asset transactions, including at least one end user and at least one digital asset supplier, and details of digital assets available from the digital asset supplier; in response to a request from said one end user for a respective digital asset authenticating the request by reference to the metadata register to verify that the metadata register lists said one end user and the respective digital asset; and in response to an authentic request producing a unique tag and creating a security container for the tag comprising data relating to events involving the tag, the security container initially containing data relating to the end user, the digital asset request and the digital asset; and thereafter, generating a message for said one end user, said message including the tag and authorizing release of said digital asset.

According to another aspect of the present invention, there is provided a method for the on demand authentication of software applications, comprising: storing in a metadata register details of parties enrolled for transactions, including at least one end user, and at least one software application that is available for use on demand; in response to a request from said one end user for said one software application, validating the request by reference to the metadata register to verify that the metadata register lists said one end user and said one software application; in response to a valid request: producing or locating for said one software application a unique tag and a security container for the tag comprising data relating to events involving the tag, the security container containing data relating to said one end user, the request and said one software application; issuing a message including the tag and authorizing release of said one software application for a prescribed instance of use; and updating the security container to include data relating to said authorization; and thereafter monitoring the security container to track authorizations of use of the software application.

According to another aspect of the present invention, there is provided a method for pay-as-you-go software application authentication, comprising: storing in a metadata register details of parties enrolled for transactions, including at least one end user, and at least one software application that is available for prescribed instances of use; in response to a request from said one end user for said one software application, validating the request by reference to the metadata register to verify that the metadata register lists said one end user and said one software application; in response to a valid request: producing or locating a unique tag and a security container for the tag comprising data relating to events involving the tag, the security container containing data relating to said one end user, the request and said one software application; issuing a message including the tag and authorizing release of said one software application for said prescribed instance of use; and following said prescribed instance of use of said one software application terminating said use except in the event that another said prescribed instance of use has been authorized.

BRIEF DESCRIPTION OF THE DRAWINGS

The invention will be described further, by way of example, with reference to the following drawings, in which.

DETAILED DESCRIPTION

The present invention comprises a digital asset authentication system shown generally in and described with reference to FIG. 1 of the drawings, as well as an authentication process, for ensuring the secure validation and release of a digital asset, in the form of a digital file, from a digital asset supplier, who may be a digital asset distributor and/or a digital asset owner, to an end user.

The digital file may represent a copyright protected work, and examples of digital assets to which the present invention may be applied include, but are not limited to, text files, e-mails, blogs, twitters, instant messages, audio files, image files, video files, movie files, profiles, programs and other electronic embodiments of information relating to intellectual property assets, such as music, video, film, artworks, written material, articles, essays and books, or clips or chapters therefrom etc. The digital file may alternatively or as well represent a software application or computer program.

One significant implementation of the invention is in the on demand or pay-as-you-go authentication or authorization for use of software applications.

Figure 1:
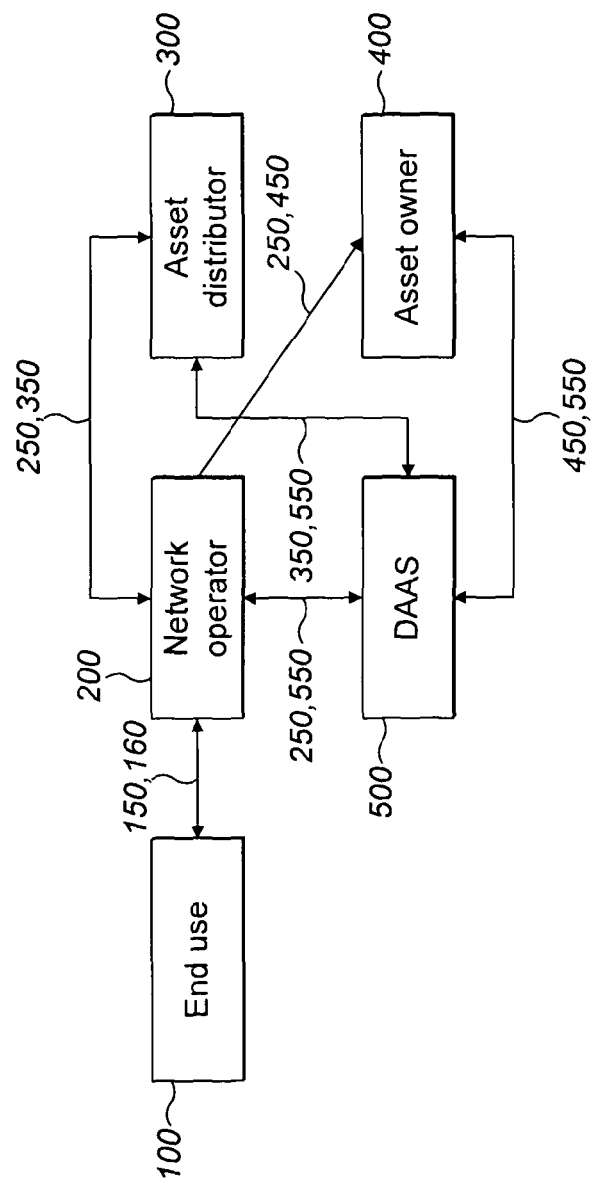
FIG. 1 is a block diagram of a digital asset authentication system in accordance with the present invention.

The authentication system shown in FIG. 1 represents a number of parties comprising an end user 100, a digital asset distributor 300 and a digital asset owner 400, in communication with one another by way of a network operator 200 and a digital asset authentication apparatus 500 embodying the present invention. These parties together comprise a digital asset distribution network, in which according to the present invention digital assets may be authenticated and transferred in a secure manner from the digital asset owner 400 and/or the digital asset distributor 300 through the network operator 200 to the end user 100 upon request. For this purpose, the digital asset authentication apparatus 500 generates and issues a digital asset HashValue, to be described below, for each requested digital asset, and sets up a security container, as defined below, for all such HashValues, and organises multiple and increasingly secure processes of validation before permitting release of a particular digital asset to a respective end user.

Figure 2:
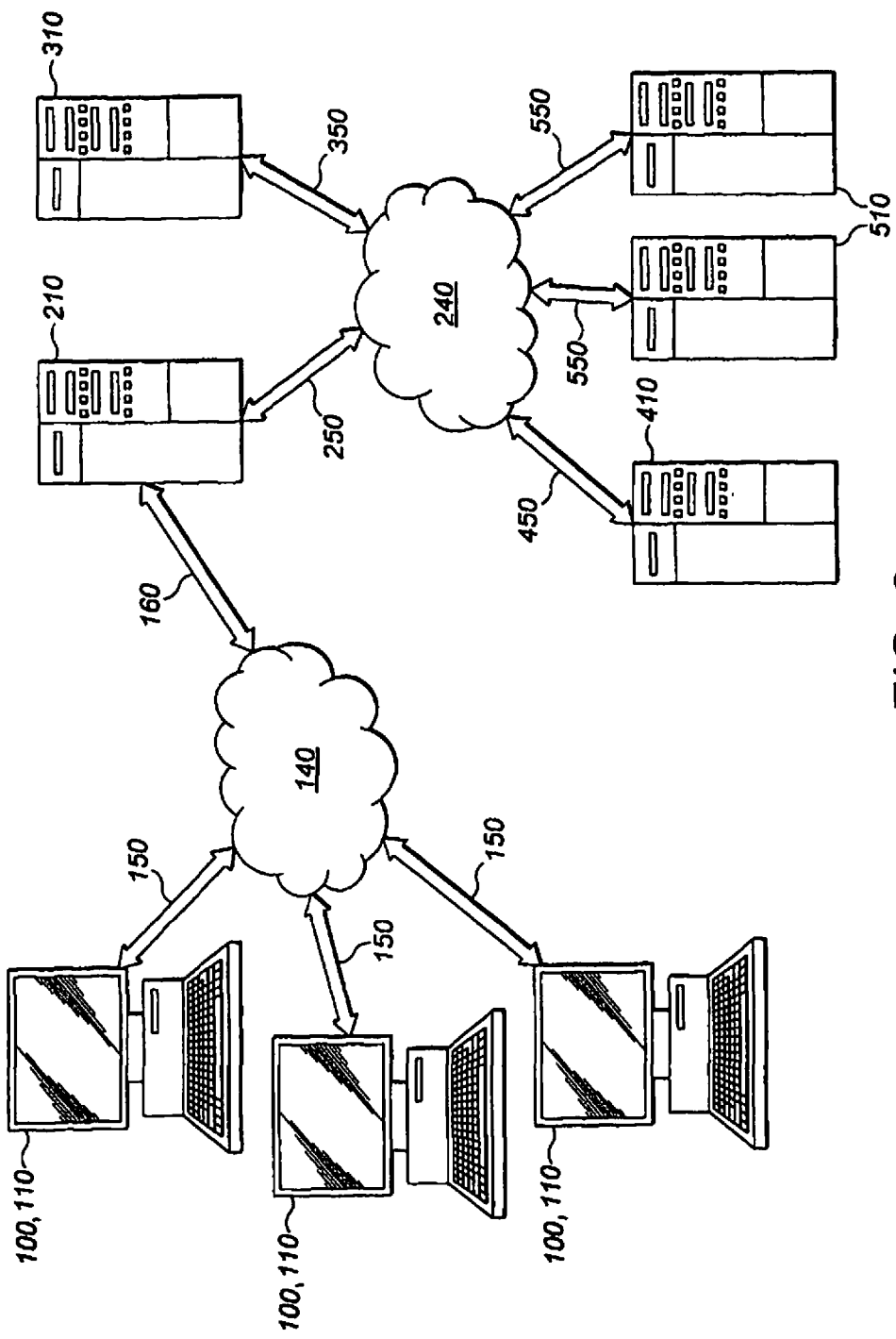
FIG. 2 is a diagrammatic view of a distributed computing environment providing a network composing the system of FIG. 1.

It will be understood at once that each of the above parties may be acting as a proxy for a further more remote such party, and also that there may be more than one of each party, as may be apparent from FIG. 2, which shows a distributed computing environment in which the present invention may be practiced.

As shown in FIG. 2, each end user 100 is here considered to be an individual and is represented by a personal computer workstation 110, which is in communication with a router/server 210 of the network operator 200 by way of communication links 150, a communications network 140 and a communications link 160. The network server 210 is in communication, respectively, with a digital asset distributor server 310 of the digital asset distributor 300, an asset owner server 410 of the digital asset owner 400, and servers 510 of more than one digital asset authentication apparatus 500, by way of a communications link 250, a communications network 240 and respective communications links 350, 450, 550.

Although in FIG. 2, the end user 100 is assumed to be an individual with a personal computer workstation 110, the end user may equally well be an organization and be represented by a router/server or network. Thus, each end user station 110 can, by way of example only, be any of a personal computer, a mini computer, a main frame computer, a network computer, a wireless device, an information appliance, a cellular/mobile telephone, a home entertainment system, or any other computing device having the capacity to execute end user software and an operating system.

Further, each of the routers/servers 210, 310, 410, 510 can, by way of example only, be a traditional server device, a web server, an application server, a DNS server, network router or any other type of server or network processing device.

The communications networks 140, 240, in each case, can be any of a variety of networks, including by way of example only a standard PSTN telephone network, a local area network (LAN), a medium area network (MAN) or a wide area network (WAN), such as the Internet or the World Wide Web. The communications links, in each case, can be any of a variety of connections, including LAN, MAN, WAN links, broadband connections, such as ISDN, Frame Relay ATM, ADSL or CABLE, and wireless connections, such as IEEE 802.11x. Further, the end user stations 110 and the router/servers 210, 310, 410 and 510 may communicate by means of a variety of communication protocols, such as for example TCP/IP, IPX, SPX, NetBIOS, NetBEUI and direct asynchronous protocols.

For the sake of simplicity and ease of reference, it will be assumed in the following description that there is only one end user station 110, one network operator server 210, one asset distributor server 310, one asset owner server 410, one authentication apparatus server 510, and a single digital asset, although of course it will be well understood that in practice the system of the present invention is intended to handle multiple such parties and plural digital assets and will therefore be considerably more complex.

The end user station 110 and various servers 210 to 510 are illustrated in greater detail in FIGS. 3a to 3e, and will be described next, together with the initiation of the process according to the invention.

In order to make use of the system according to the invention, each one of the end user 100, the network operator 200, the asset distributor 300 and the asset owner 400 must first enroll with the digital asset authentication system 500 by undergoing an enrollment procedure with the authentication system 500. During this procedure, the relevant party will supply to the digital asset authentication system 500 a party reference representing a network address for the party, and the authentication system 500 will allocate to the relevant party a unique ID (end user ID, network operator ID, asset distributor ID or asset owner ID) in the form of an alphanumeric string typically representing the name of the relevant party. The party IDs are all assigned by the authentication system 500, which will associate the party ID with the party reference and then store such party ID and reference information for future use, as described below.

Furthermore, an asset distributor 300 and an asset owner 400 on enrollment with the system will also supply to the authentication system 500 a full list of all their digital assets, or copyright protected works, available in the public domain, each identified by a respective digital asset ID in the form of an alphanumeric string representing the title of the work and by a digital asset reference representing the address at which the digital asset is to be found. By contrast with the party IDs, that are allocated by the authentication system 500, the digital asset IDs simply comprise the digital asset titles taken from the public domain and are not uniquely allocated by the system 500. The system 500 will likewise store the list of digital asset IDs and digital asset references in connection with the associated asset supplier 300, 400, as described below.

The inventive software and hardware architecture elements according to the invention and their operation are generally similar in each of the end user station 110, the network operator server 210, the asset distributor server 310, and the asset owner server 410, and therefore it will suffice to describe in detail simply one of them, namely the end user station 110, and the associated communications with the authentication system 500.

Figure 3A:
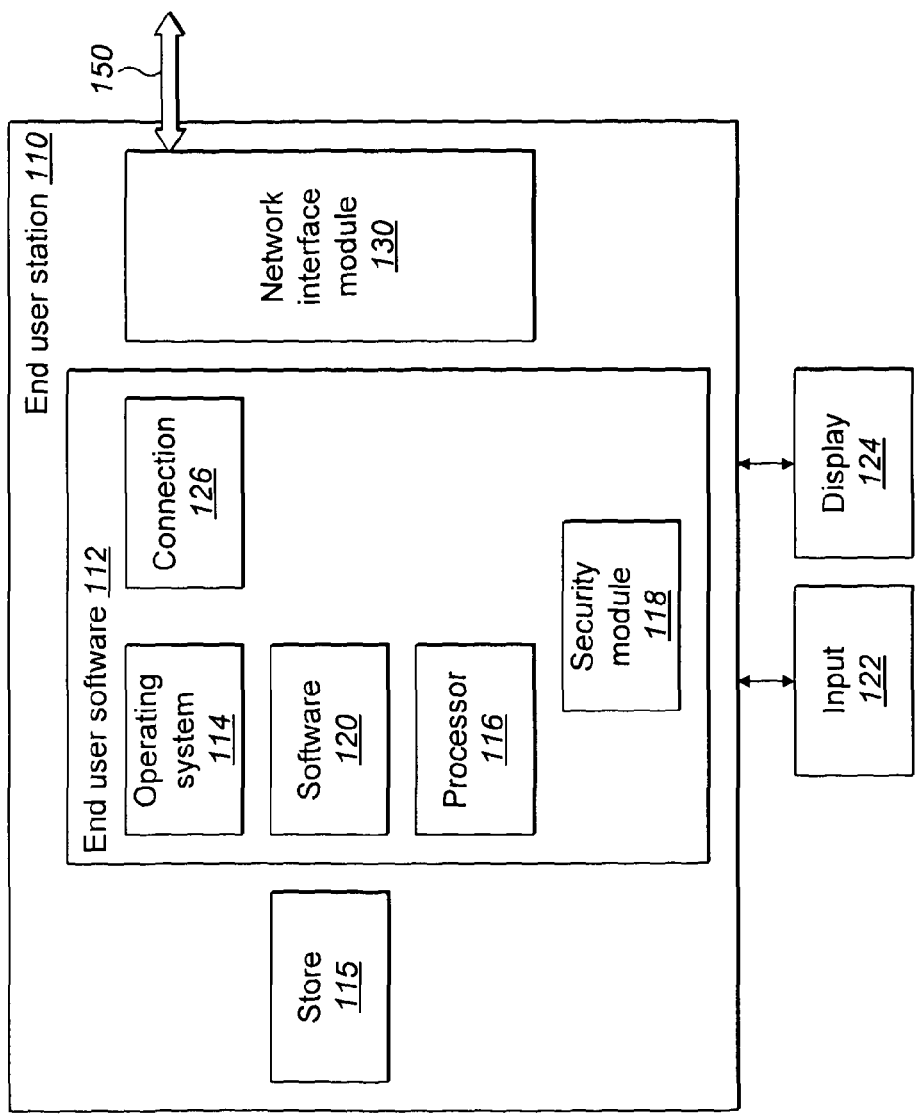
FIG. 3a is a block diagram of an end user workstation of the system of FIGS. 1 and 2.

Referring now to FIG. 3a, therefore, the end user station 110 is illustrated, and typically includes end user software 112 comprising an operating system 114, a processor 116, a security module 118 and application software 120. A store 115 serves for storing end user, digital asset and transaction information. The processor 116 is arranged to execute the security module 118 and application software 120 in response to user input from an input 122 with the aid of a display 124, in order first to enroll the end user 100 with the authentication system 500 and subsequently to find, identify and make a request for a selected digital asset. Messages from the end user software 112 are supplied by way of a secure connection 126 to a network interface module 130, and thence to the communications link 150.

Such messages are passed to the network operator server 210 by way of the communications network 140 and communications link 160, and then by the network operator server 210 to the digital asset authentication system 500 according to the invention by way of the communications link 250, the communications network 240 and the communications link 550.

Responses from the digital asset authentication system 500 are returned via the same route, and are evaluated by the processor 116 and application software 120. Such responses may include a HashValue and a digital asset release key supplied by the authentication system 500 according to the invention, respectively for future identification of the digital asset request and for subsequent reconciliation purposes, and such HashValue and release key are also stored in the store 115.

Figure 3B:
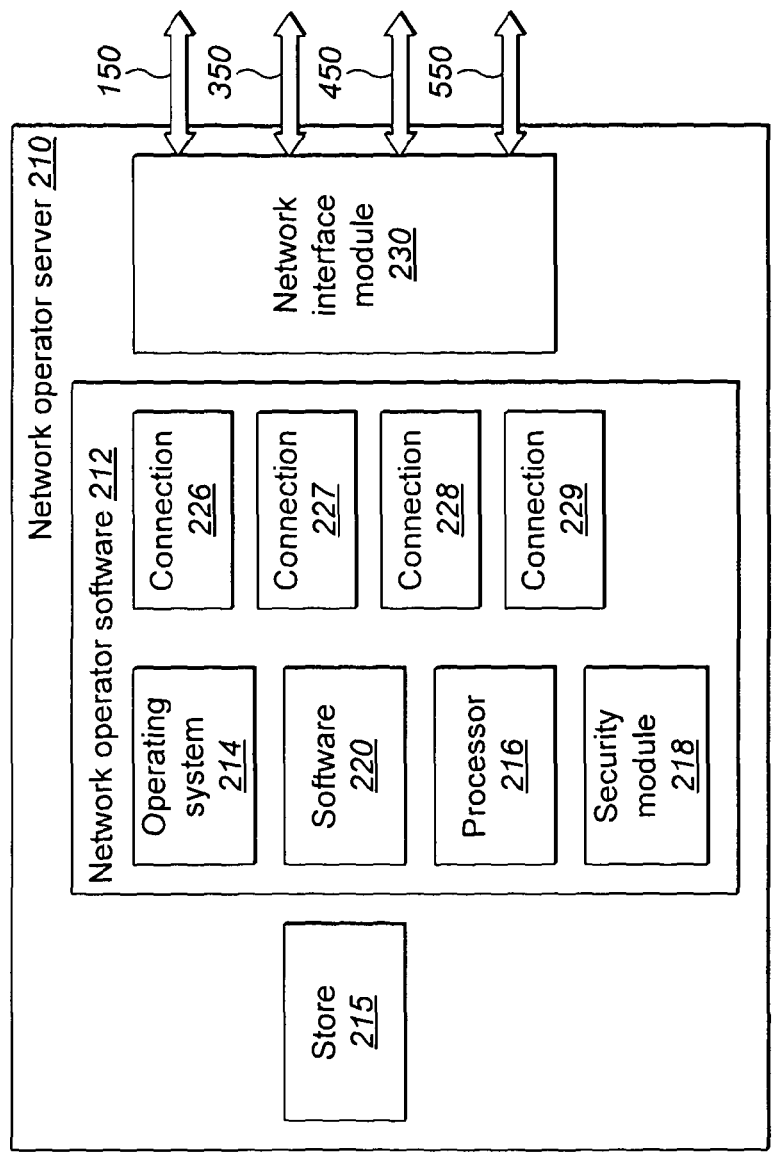
FIG. 3b is a block diagram of a network operator server of the system of FIGS. 1 and 2.
Figure 3C:
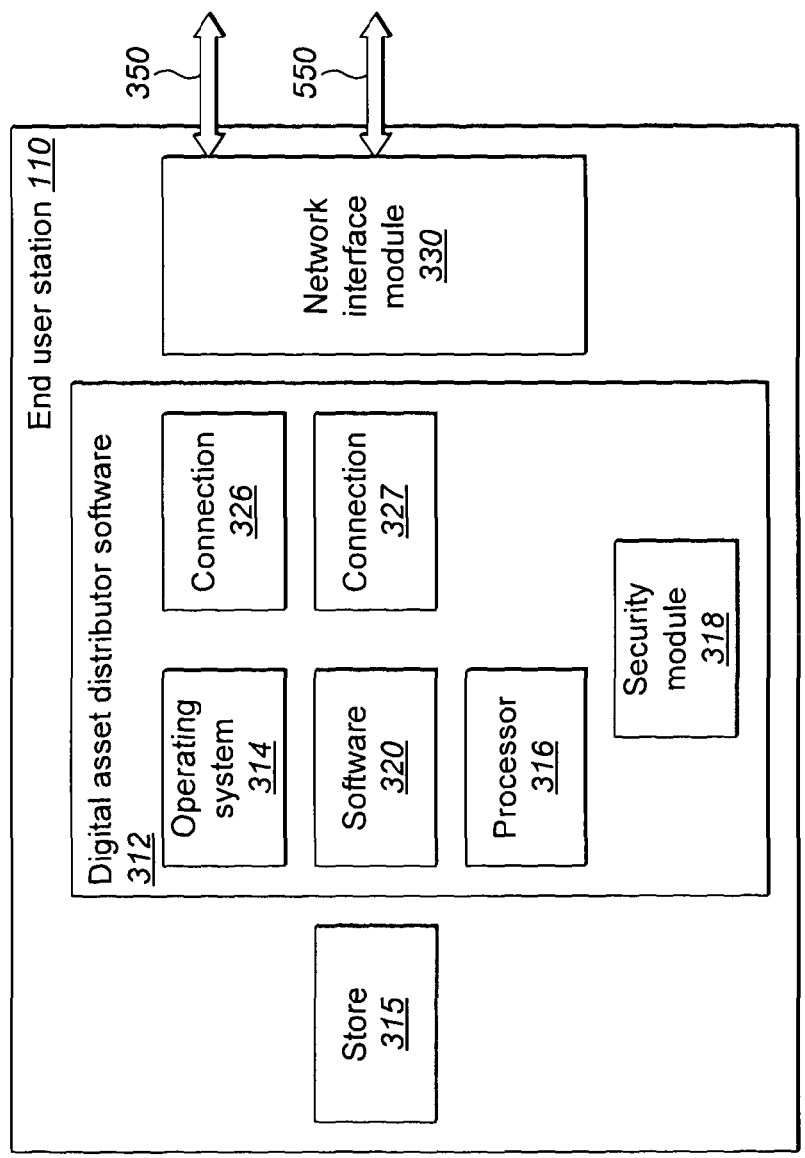
FIG. 3c is a block diagram of a digital asset distributor server of the system of FIGS. 1 and 2.
Figure 3D:
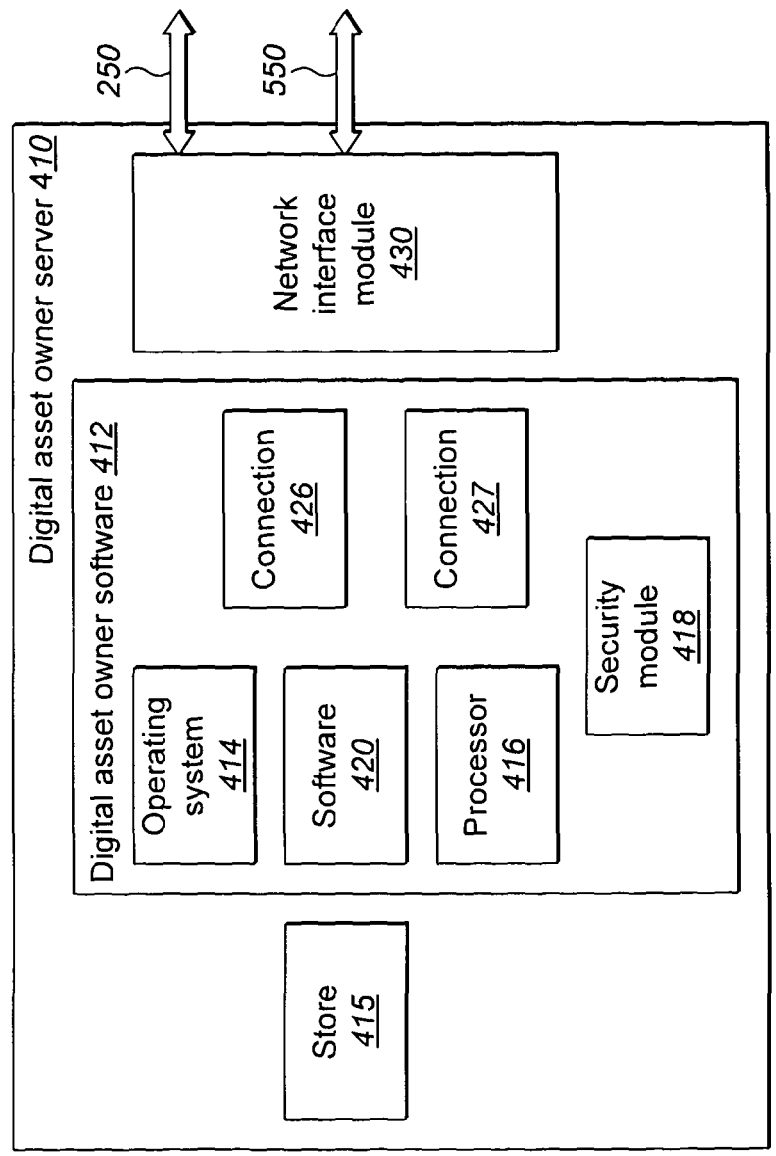
FIG. 3d is a block diagram of a digital asset owner server of the system of FIGS. 1 and 2.

The network operator server 210, asset distributor server 310 and asset owner server 410 are shown in FIGS. 3b to 3d and comprise effectively the same elements as the end user station 110 shown in FIG. 3a, with the exception that messages from the associated network operator software 212, digital asset distributor software 312 or digital asset owner software 412 are supplied by way of associated secure connections 226 to 229 or 326, 327 or 426, 427 to a respective network interface module 230, 330, or 430 for output along the links illustrated in FIG. 1. In other respects, the operation of the relevant server in each case is similar to the operation of the end user station 110.

Figure 3E:
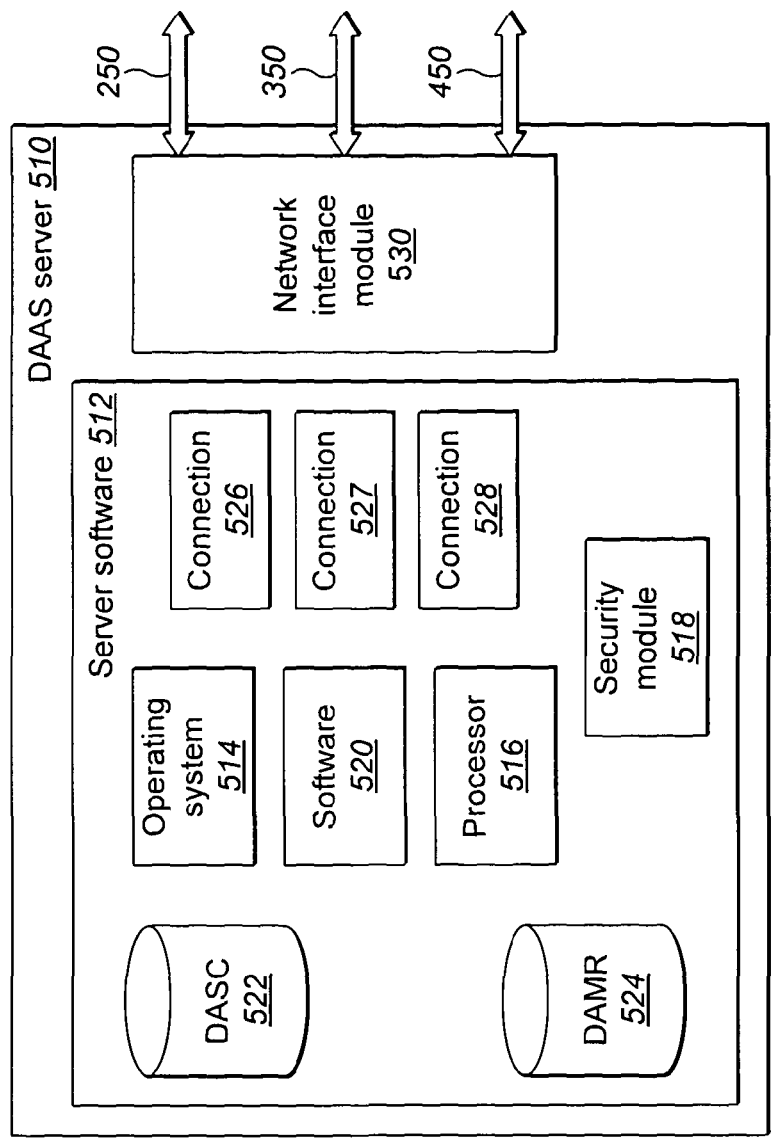
FIG. 3e is a block diagram of a digital asset authentication server of the system of FIGS. 1 and 2.

The digital asset authentication server 510 shown in FIG. 3e typically includes server software 512, comprising an operating system 514, a processor 516, a security module 518 and authentication software 520. The processor 516 is arranged to execute the security module 518 and authentication software 520 firstly to generate all of the party IDs on enrollment, and later to generate a digital asset HashValue and thence a digital asset security container, as described below. For the latter purpose, the security module 518 is arranged to act as a random number generator, as described below. The processor 516 is also arranged to execute the security module 518 and authentication software 520 to generate a digital asset release key for reconciliation purposes, as described below.

The server software 512 further includes a digital asset security container store 522, in which the HashValue and digital asset security container are stored, and a digital asset metadata register 524 containing details of all the parties and digital assets that have been enrolled with the system. In particular, the metadata register 524 contains a table or list of the party IDs assigned by the authentication system 500 to the end users 100, the network operators 200, the asset distributors 300 and the asset owners 400 who have enrolled with the system according to the invention, and an associated table or list of the associated party references, indicating the locations or network addresses of the relevant parties. In addition, the metadata register 524 includes a table or list of all the digital assets available from those asset distributors and asset owners who have enrolled with the system. On enrollment, a new asset distributor or owner supplies such list to the system 500, which then associates the asset supplier ID with the list of all their digital asset IDs and digital asset references, and enters the relevant information in the metadata register 524.

Finally, the server software 512 comprises a plurality of connection modules 526, 527 and 528 for receiving and transmitting messages associated with the server software 512, through a network interface module 530 of the server 510 and communication links 250, 350 and 450. Each connection module 526, 527 and 528 is associated with a respective one of the communication links 250, 350 and 450, and provides an entirely secure connection for receiving inputs from the same communication links for metadata production and storage in the register 524 and for transmitting messages for validation purposes with respect to digital asset security container 522.

When the end user 100 wishes to enroll with the digital asset authentication system 500, the end user sends a request to this effect by way of the network server 210. On receipt of the request within the server software 512, the processor 516 executes the authentication software 520 to obtain from the security module 518 an end user ID in the form of a unique alphanumeric string identifying the end user, and both stores this end user ID with an associated end user reference or network address in the metadata register 524 and transmits the end user ID back to the end user 100. The end user software 112 then stores such information in the store 115. The same process is effected for the enrollment of any other party.

Figure 4:
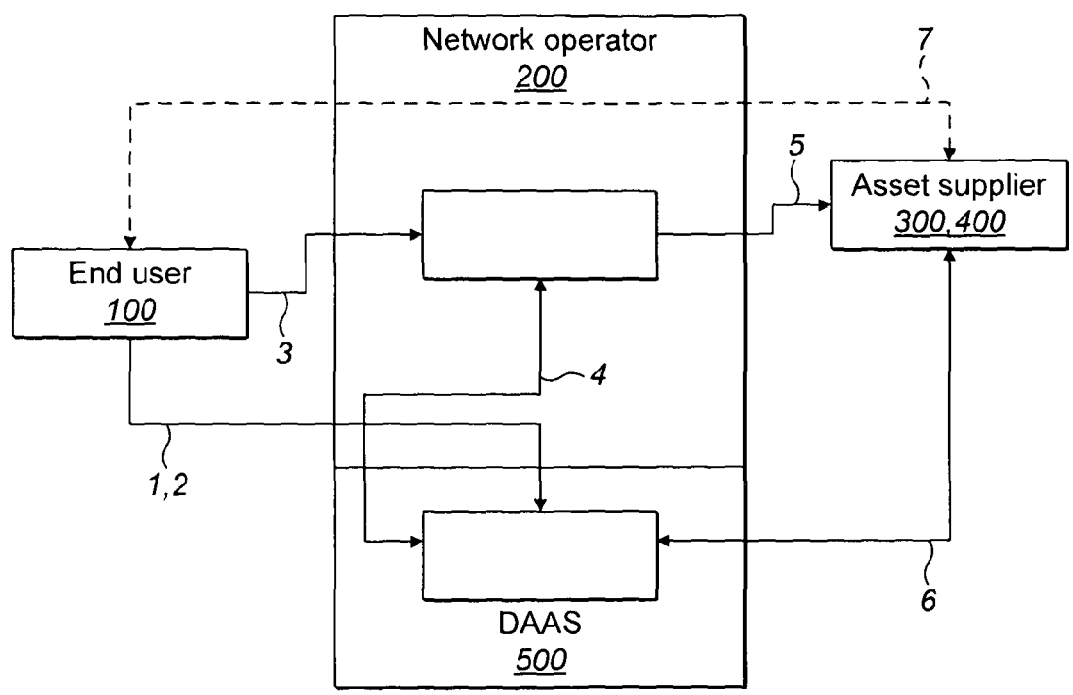
FIG. 4 is a general flow diagram of the basic steps involved in authenticating a digital asset according to the invention.

When the end user 100 wishes to request a particular digital asset, a process as shown generally in and described with reference to FIG. 4 is executed:

(1) The end user 100 selects the digital asset from the public domain or from a universal resource locator (URL) and obtains its digital asset ID, comprising the alphanumeric string representing the title of the selected copyright protected item. The end user 100 then dispatches a request for the particular digital asset by way of the network operator 200 to the digital asset authentication system 500, for validation of the request.

(2) Following receipt of the digital asset request from the end user 100, the digital asset authentication system 500 first validates the request and then locates the digital asset reference or network address in the digital asset metadata register 524. If the request is successfully validated, the authentication system 500 generates a unique HashValue and digital asset release key. The digital asset authentication system 500 then sends a message back to the end user 100 including the digital asset reference, the unique HashValue and the release key.

(3) On receipt of the digital asset reference, the end user 100 issues a demand for the digital asset, including the unique HashValue and the digital asset reference.

(4) The network operator 200 captures the demand and validates the HashValue with the digital asset authentication system 500, which issues a new release key and adds this new release key to the digital asset security container 522 in association with the HashValue. The digital asset authentication system 500 sends a message with the unique HashValue and the new release key back to the network operator 200.

(5) Thereafter, the network operator 200 passes the demand on to the digital asset supplier 300, 400 together with the digital asset reference and the unique HashValue.

(6) The digital asset supplier 300, 400 likewise validates the unique HashValue with the digital asset authentication system 500 in the same way, and the digital asset authentication system 500 issues another new release key and adds this further new release key to the digital asset security container 522 in association with the HashValue. The digital asset authentication system then sends back a validation message with the HashValue and the still further release key.

(7) Finally, the digital asset supplier 300, 400 releases the selected digital asset to the end user 100.

Figure 5A:
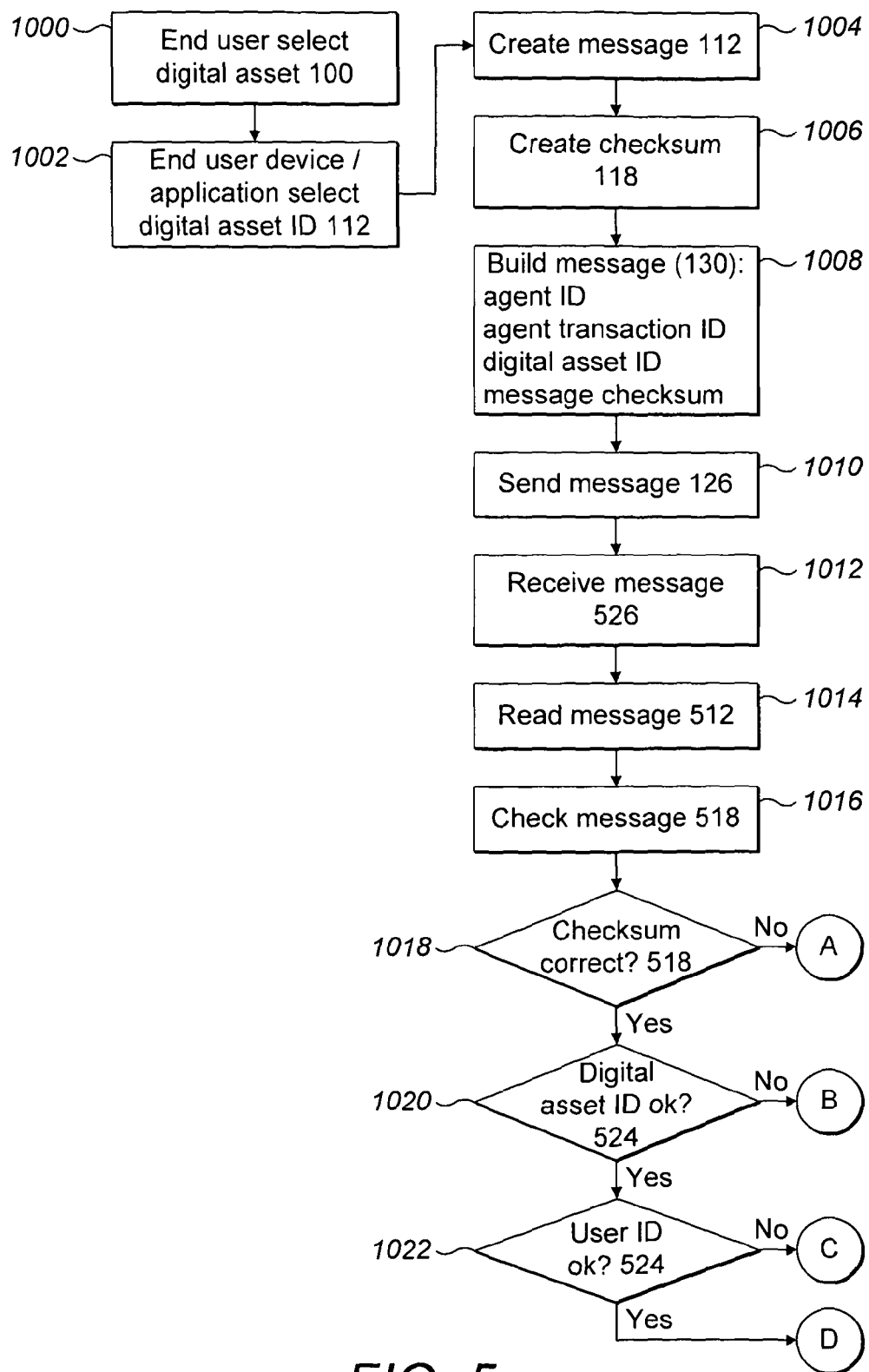
FIGS. 5a and 5b together comprise a flow chart of the initial steps involved in validating a digital asset request according to the invention.
Figure 5B:
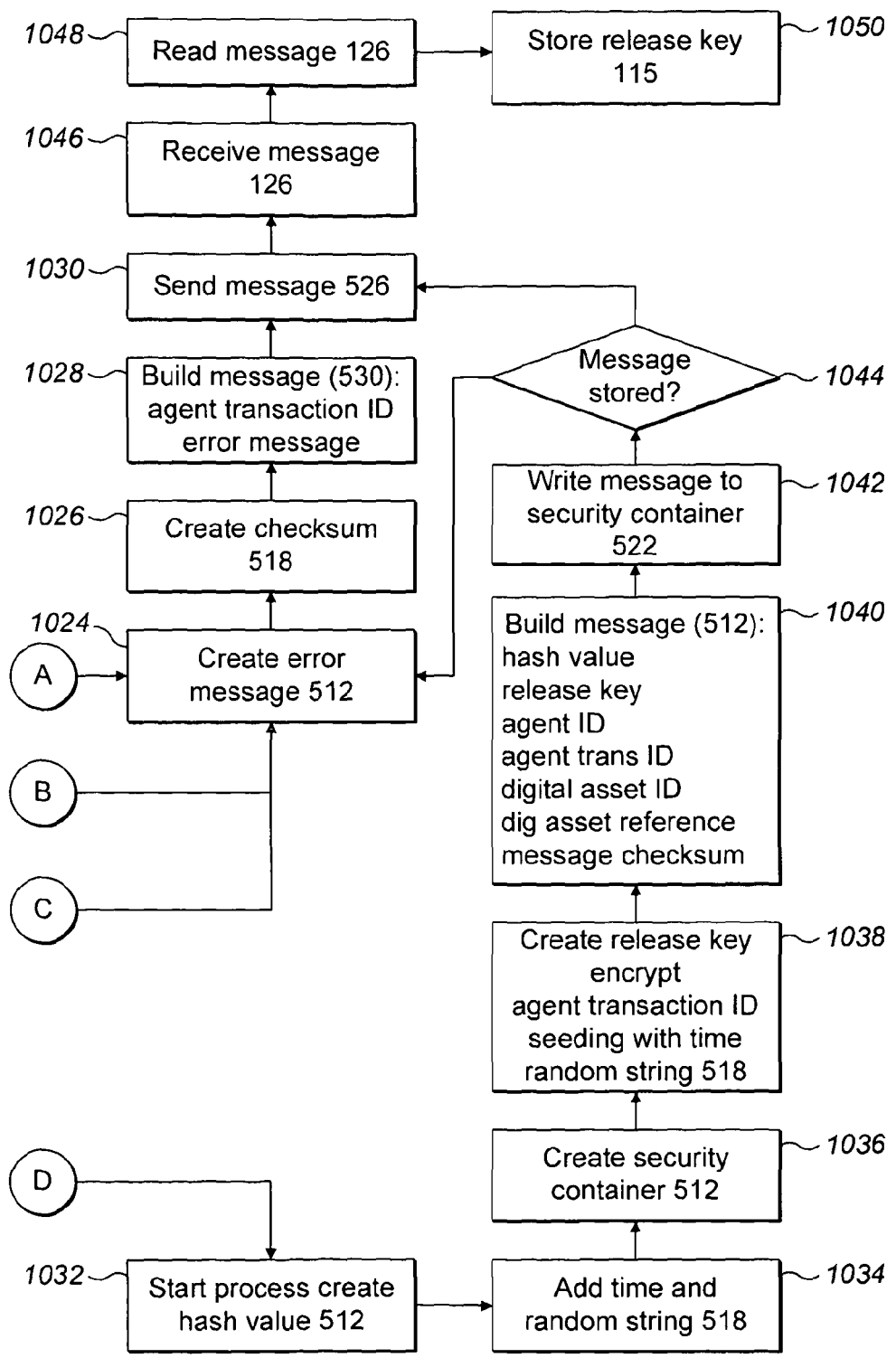

These steps will now be described in greater detail with reference to FIGS. 5*a* and 5*b*.

Firstly, the end user 100 selects the digital asset and enters the details by way of the input device 122 in step 1000. In step 1002, the application software 120 logs in the store 115 the digital asset ID entered into the end user software 112 by the end user, and begins in step 1004 to create a request message by locating in the store 115 the end user ID assigned by the invention and by obtaining from the security module 118 and adding an end user transaction reference in the form of an alphanumeric string representing a unique request from the end user. In order to ensure that the message is transmitted in a secure fashion, the application software 120 also in step 1006 instructs the security module 118 to calculate an associated checksum, which is a 32 bit number indicating the amount of information to be transmitted. The checksum serves for establishing the integrity of the transmission and that the information has not been corrupted during transmission.

The application software 120 then builds the entire message including the digital asset ID, the end user ID, the transaction reference and the checksum, in step 1008 and in step 1010 dispatches the request by way of the secure connection 126 and network interface module 130. The message is received by the digital asset authentication system 510 by way of the communications link 250, the network interface module 530 and the secure connection 526 in step 1012, and is read by the authentication software 520 in step 1014. The authentication software 520 checks the quantity of information in the message and the checksum in step 1016, and enquires in step 1018 whether the checksum is correct. If the answer is no, the server software 512 proceeds to step 1024.

On the other hand, if the answer is yes, the authentication software 520 proceeds to step 1020 and reads the digital asset ID in the message and looks up the digital asset ID in the metadata register 524. If the digital asset ID is not located, the authentication software 520 again proceeds to step 1024, but if the digital asset ID is located, the authentication software 520 next enquires in step 1022 whether the digital asset is available to the end user 100. The authentication software compares the end user ID with the information in the metadata register 524 to check that the end user is enrolled, for this purpose. If the answer to step 1022 is a no, the authentication software 520 once again proceeds to step 1024.

Thus, when any of the checksum, the digital asset ID and the end user ID does not tally, the authentication software 520 generates an error message in step 1024, adding the end user ID and the end user transaction reference. Then the authentication software 520 creates an associated checksum in step 1026 and builds an error message in step 1028, including the end user ID, the end user transaction reference, the error message and the checksum. Such message is transmitted over connection 526 by way of network interface module 530 back to the end user 100 in step 1030.

In the event, on the other hand, that the checksum tally in step 1018, the digital asset ID tally in step 1020 and the end user ID tally in step 1022 are all valid, indicating that the requested digital asset can be distributed to this end user, the authentication software 520 proceeds to step 1032 and initiates the particular process according to the invention involving the generation by the security module 518 of a unique HashValue and the creation of a digital asset security container for the HashValue, and the storage of both in the digital asset security container store 522.

The generation of the HashValue for the digital asset will be described first, following which the use of such HashValue in creating the digital asset security container for the authentication and increasingly secure validation of the release process for the respective digital asset will be described. The creation of a digital asset release key for subsequent reconciliation processes will also be explained.

Figure 6:
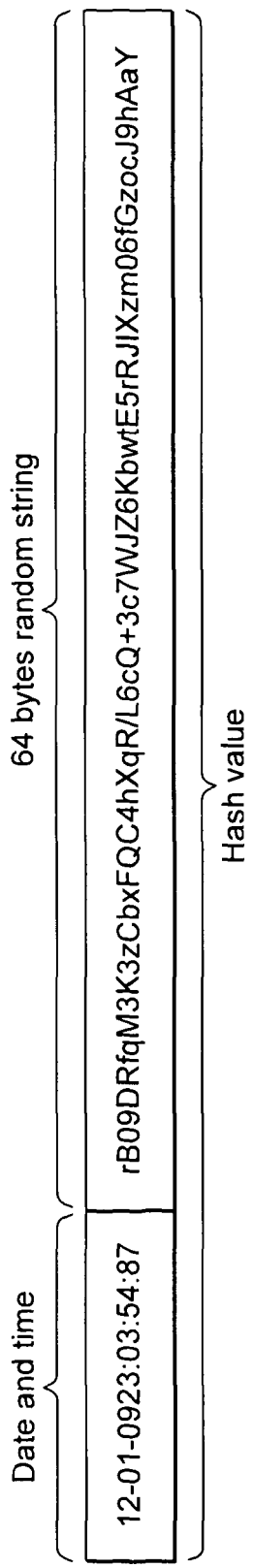
FIG. 6 is a schematic representation of a HashValue employed in the present invention.

A representation of such HashValue is shown in FIG. 6, and it can be seen that it comprises a random part in the form of a unique 64 byte alphanumeric string and a time part in the form of a 19 byte alphanumeric string. The random part constitutes a unique randomly generated distinguishing characteristic, and the time part represents the time of creation of the HashValue. The HashValue is generated by the security module 518, employing its random number generating facility and a clock facility, under the instruction of the authentication software 520 in step 1034, and thereafter constitutes a unique tag for identifying every future event relating to this particular digital asset request and its subsequent implementation. The HashValue thus generated is stored in the security container store 522.

The authentication software 520 then combines the HashValue with the transmitted end user ID, end user transaction reference, and digital asset ID, the combined code thus formed constituting the security container in its initial state. Such security container is entered in the security container store 522 in step 1036. Thereafter, every new transaction involving the particular digital asset request is identified by means of the HashValue and is added to the initial security container and similarly entered in the security container store 522.

Next, in step 1038, a user digital asset distribution or release key is created and issued under the control of the authentication software 520, by encrypting the end user transaction reference and by seeding the encrypted end user transaction reference with another random number in the form of a 64 byte alphanumeric string and a current time value produced by the security module 518. The form of the random number and time value resemble those shown for the HashValue in FIG. 6, and, although these same codes could be employed again for the digital asset release key, it is preferred that a new random number and time value be generated for the release key. The function of the release key will be described later. The release key thus generated is stored in the security container store 522 in association with the HashValue.

A response message is then built up in step 1040 for authorizing release of the digital asset and for communicating to the end user 100 the associated digital asset reference, which is the network address or location of the digital asset, such as the web address on the internet, e.g. http://www.play.com/ref, from which the digital asset may actually be obtained. The authentication software 520 refers to the metadata register 524 for obtaining this information concerning the network address for the digital asset. The response message is then produced by combining the original HashValue, the user release key, the end user ID and end user transaction reference, the digital asset ID and the digital asset reference, and an associated checksum.

In step 1042, this message is written into the security container store 522 and a check is made in step 1044 as to whether the message has been correctly stored. If the answer is no, the authentication software reverts the process to step 1024, and proceeds as before. On the other hand, if the answer is yes, the authentication software advances to step 1030 and sends a response message releasing the digital asset for the end user 100.

The response message including the digital asset reference and the distribution or release key is received by the end user station 110 in step 1046 and is read by the application software 120 in step 1048. This step 1048 includes verifying the checksum added to the message to ensure that no transmission errors or corruptions have arisen. Finally, in step 1050, the application software 112 stores the HashValue, the agent transaction reference, the digital asset reference and the user release key in the store 115.

Figure 7A:
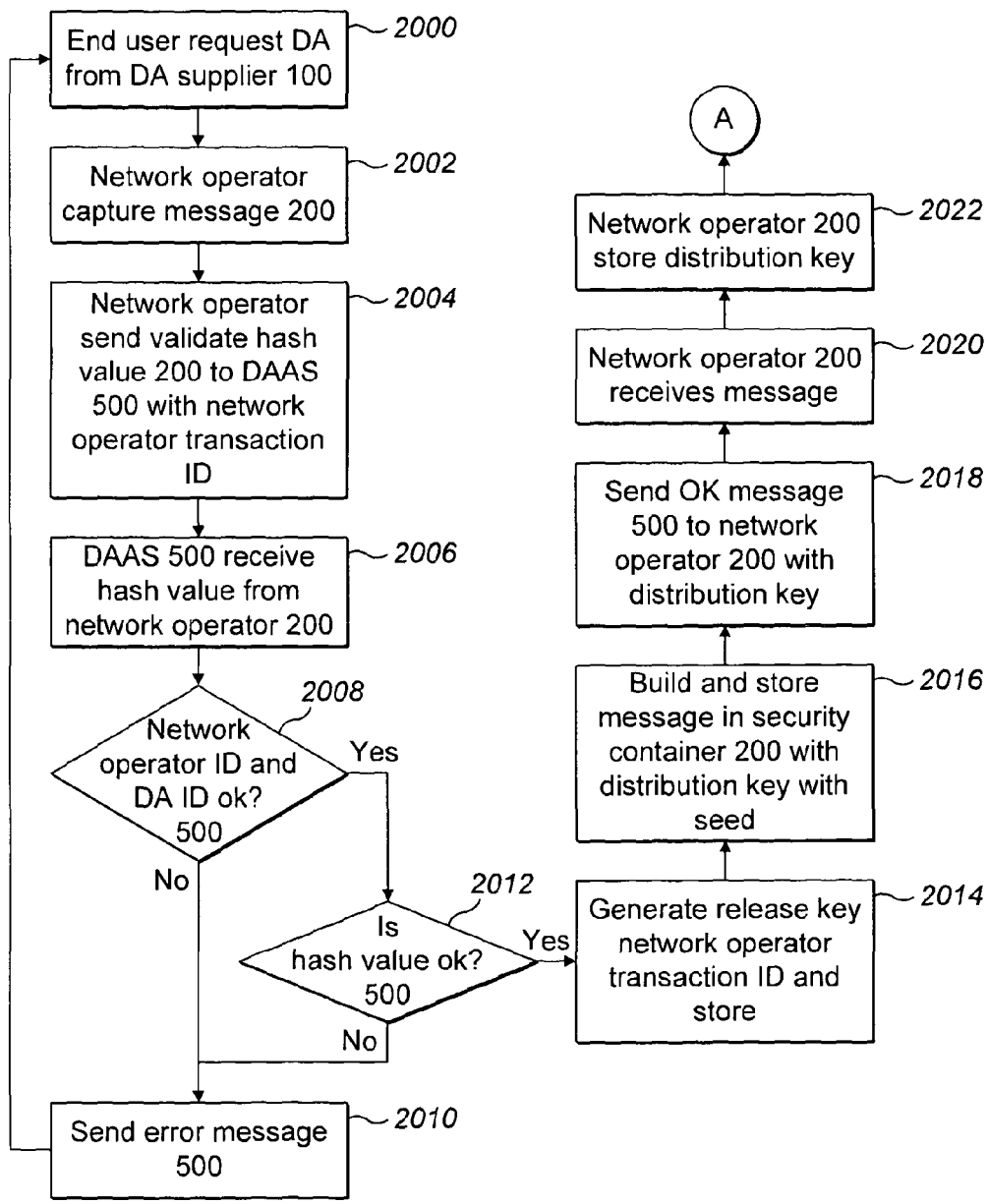
FIGS. 7a and 7b together comprise a flow chart of the steps involved in releasing a digital asset according to the invention.
Figure 7B:
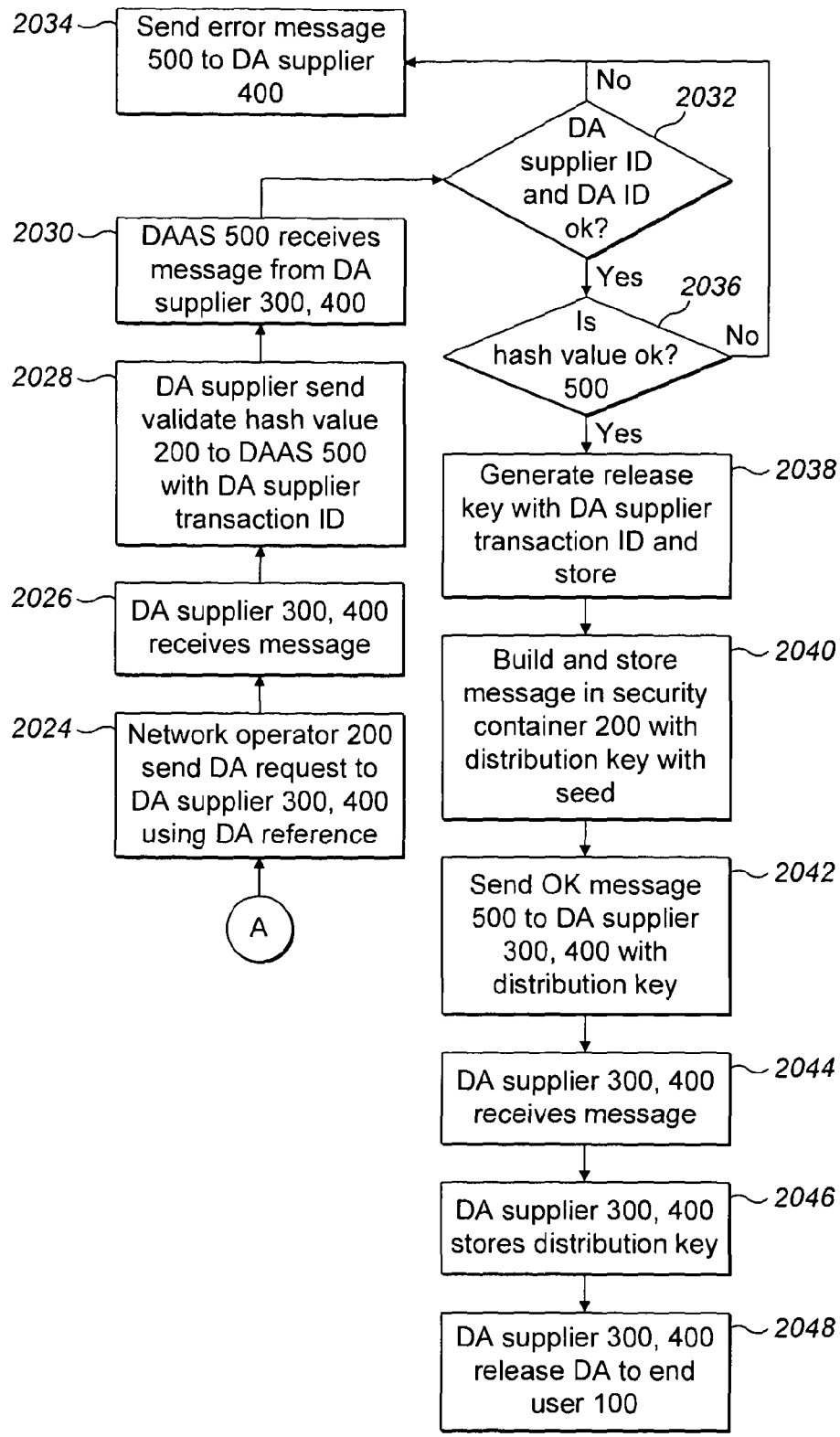

Having received the HashValue, the digital asset reference and the user release key from the digital asset authentication system 500, the end user 100 has now been authorized to receive the digital asset and has been informed where the digital asset can be obtained. Accordingly, the processor 116 executes the application software 120 to issue a demand for the same in the form of a distribution request for transmission by way of the network operator 200 to the asset supplier 300, 400. Such process will be described with reference to FIGS. 7a and 7b.

Firstly, in step 2000, the end user 100 issues the demand to request the digital asset from the supplier 300, 400. The demand includes the end user ID, the end user transaction reference, the digital asset ID, the digital asset reference and the original unique HashValue, together with a message checksum. The end user software 112 builds the message in the same way as has already been described with reference to FIG. 5, and therefore the full detail will not be repeated here.

The network operator 200 captures the message in step 2002, checks the checksum to verify that it has been received without corruption, and stores in the store 215 all of the unique HashValue, the end user ID, the end user transaction reference, the digital asset ID and the digital asset reference. The processor 216 then executes the application software 220 to extract the HashValue from the store 215 and to add to it the network operator ID and a network operator transaction reference, and dispatches the HashValue with the network operator ID and transaction reference to the digital asset authentication system 500 by way of the secure connection 229 and the network interface module 230 for authentication. This takes place in step 2004, and includes the generation and sending of a checksum as previously.

In step 2006, the digital asset authentication system 500 receives the message from the network operator 200 and verifies by reference to the checksum that the transmission has not become corrupted in transit. The digital asset authentication system 500 proceeds to step 2008, and firstly enquires whether the network operator ID and the digital asset ID are valid by reference to the metadata register 524. If not, the digital asset authentication system 500 returns an error message in step 2010. Otherwise, the digital asset authentication system 500 proceeds to step 2012 and verifies whether the unique HashValue is valid. For this purpose, the server software 512 refers to the digital asset security container 522 to compare the received HashValue with the originally issued HashValue. If not, the system again reverts to step 2010 and sends an error message. Otherwise, the system proceeds to step 2014.

Assuming that the HashValue is verified, the authentication system server software 512 generates a new release key for the network operator in step 2014 by taking the network operator transaction reference, encrypting it and seeding it with a new 64 byte random string and associated time value. The authentication system 500 stores the current event to the digital asset security container by writing the HashValue into the security container store 522 in conjunction with the network operator release key. In step 2016, the authentication system 500 then builds a message incorporating the HashValue, the network operator release key, the network operator ID, the network operator transaction reference and the digital asset ID and reference, and stores the message to the digital asset security container by writing the message into the security container store 522. The authentication system 500 then proceeds to step 2018 and sends the message to the network operator 200 over the secure connection 526 by way of the network interface module 530. Such message includes a message checksum.

In step 2020, the network operator 200 receives and verifies the checksum in the message, and then in step 2022 stores the network operator release key in the store 215.

Having had the HashValue authenticated by the digital asset authentication system 500, the network operator 200 proceeds to pass the demand for the digital asset to the digital asset supplier 300, 400 by compiling a message in step 2024 including the end user ID, the end user transaction reference, the digital asset ID, the digital asset reference and the original unique HashValue, together with a message checksum.

The digital asset supplier 300, 400 receives the message in step 2026 and verifies by reference to the checksum that the message has been transmitted without corruption. The digital asset supplier 300, 400 then stores in the store 315, 415 all of the unique HashValue, the end user ID, the end user transaction reference, the digital asset ID and the digital asset reference.

The processor 316, 416 then executes the application software 320, 420 to extract the HashValue from the store 315, 415 and to add it to the digital asset supplier ID and a digital asset supplier transaction reference, and in step 2028 dispatches the HashValue with the digital asset supplier ID and transaction reference to the digital asset authentication system 500 by way of the secure connection 327, 427 and the network interface module 330, 430 for authentication. This step 2028 also includes the generation and sending a checksum as previously.

The digital asset authentication system 500 receives the message from the digital asset supplier 300, 400 in step 2030 and verifies by reference to the checksum that the transmission has not been corrupted in transit. Thereafter, the digital asset authentication system 500 verifies in step 2032 that the digital supplier ID and the digital asset ID are valid, making reference to the metadata register 524 for this purpose. If not, the digital asset authentication system 500 returns an error message to the digital asset supplier 300, 400 in step 2034. Otherwise, the authentication system 500 proceeds to step 2036 and verifies whether the unique HashValue is valid, referring to the digital asset security container 522 to compare the newly received HashValue with the originally issued HashValue. Once again, if the answer is no, the authentication system 500 reverts to step 2034. On the other hand, if the answer is yes, the authentication system 500 proceeds to step 2038.

In step 2038, the digital asset authentication system 500 generates another release key, this time for the digital asset supplier, by taking the digital asset supplier transaction reference, encrypting it and feeding it with a new 64 byte random string and associated time value. The authentication system 500 stores the current event in the digital asset security container in step 2040 by writing the HashValue into the security container store 522 in conjunction with the digital asset supplier release key. Thereafter, in step 2040, the digital asset authentication system 500 builds and stores a validation message including the HashValue, the digital asset supplier release key, the digital asset supplier ID, the digital asset supplier transaction reference, and the digital asset ID and reference. The digital asset authentication system then proceeds to step 2042 and sends the validation message to the digital asset supplier 300, 400 over the secure connection 527, 528 by way of the network interface 530. Such message includes a message checksum as before.

The digital asset supplier 300, 400 receives the message in step 2044 and verifies the checksum before storing the digital asset supplier release key in step 2046 in the store 315, 415. Finally, in step 2048 the digital asset supplier 300, 400 releases the digital asset to the end user 100.

Figure 8:
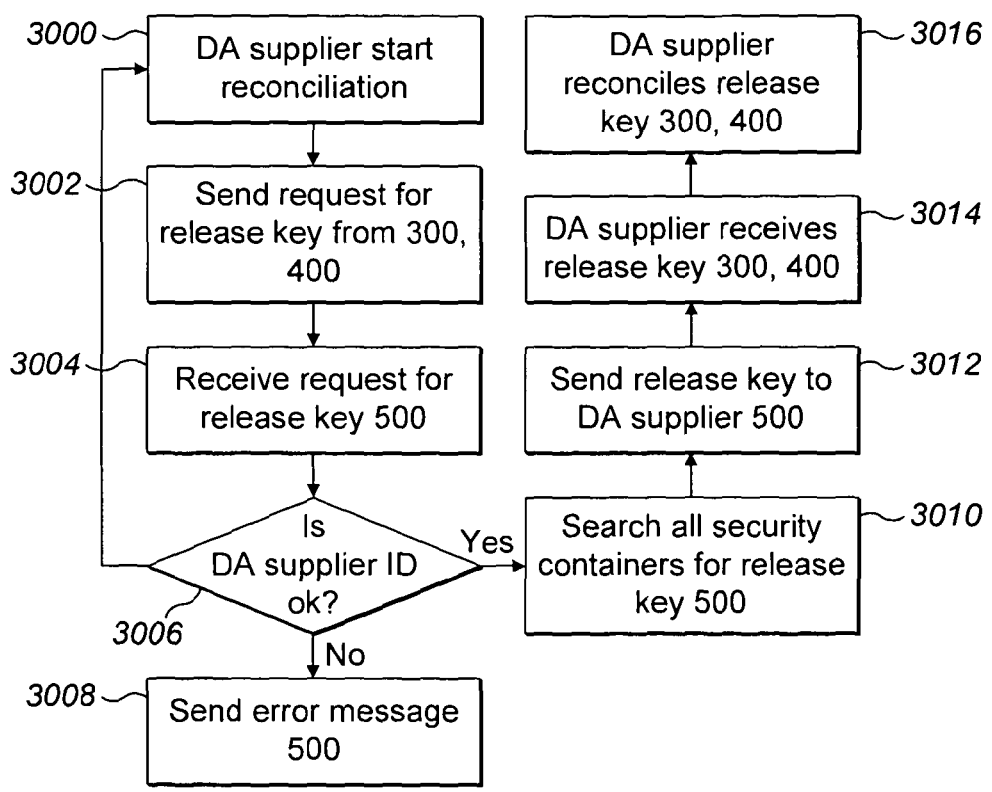
FIG. 8 is a flow chart of the steps involved in reconciling a series of digital asset release keys generated by the digital asset authentication system in accordance with the present invention.

At some later stage, for example on a monthly basis in the event that supplied digital assets carry individual charges, the digital asset supplier 300, 400 will initiate a reconciliation process as shown in FIG. 8.

According to this process in its most basic form, the digital asset supplier 300, 400 initiates the reconciliation process in step 3000, and in step 3002 transmits a message to the digital asset authentication system 500 requesting all the release keys generated within the last specified period, e.g. one month, for a specific digital asset ID. Such message includes the digital asset ID, the digital asset supplier ID and a checksum for transmission verification.

In step 3004, the digital asset authentication system 500 receives the reconciliation request and verifies that the message has transmitted correctly by reference to the checksum that is included. Thereafter, the authentication system 500 proceeds to step 3006 and verifies that the digital asset supplier ID is valid by reference to the metadata register 524. If not, the authentication system 500 issues an error message in step 3008.

On the other hand, if the check made in step 3006 is authenticated, the authentication system 500 proceeds to step 3010 and searches all the security containers in the security container store 522 for all the release keys issued to the end user 100, the network operator 200, and the digital asset supplier 300, 400 for that specific digital asset ID during the specified period. This search yields a list of release keys, which are compiled into a message in step 3012 and transmitted to the digital asset supplier 300, 400 in step 3014. The message includes a checksum for transmission verification as previously.

Thereafter, the digital asset supplier stores all these release keys in its own store 315, 415 and separately conducts a reconciliation and billing process with end user 100 and the network operator 200 and any other included party based on the list of release keys supplied by the authentication system 500.

In an extension of this basic reconciliation process, the digital asset supplier 300, 400 may send a list of digital asset IDs to the digital asset authentication system for reconciliation purposes, or may even ask for every release key associated with all of its digital assets over a specified time period.

A similar reconciliation process may also periodically be conducted by the end user 100, and/or by the network operator 200.

Although the present invention may be employed for the authentication and authorization for release of digital assets in the form of artistic copyright protected works, it also has a significant application in the authentication for download, play or use of digital assets in the form of computer programs or software applications. In this instance, the invention may be employed for authorizing the use of an already downloaded software application, or for authorizing the downloading and use of a software application from a URL or the public domain, or for the use of a software application employing cloud computing or streaming.

By way of explanation, cloud computing is here employed to refer to internet-based computing, in which shared resources, software and information are provided to end users, including their computers and other devices, on demand. Cloud computing therefore refers to a supply and delivery model for IT services provided and maintained on the internet, involving the dynamic provision of resources according to requirements. Streaming as employed here refers to the constant provision and supply of multimedia to an end user, generally over telecommunications networks, to present the media to the end user without the need for downloading the entire content. Live streaming makes streams of digitized content available to potential end users on demand via a content delivery network, so that the media can be viewed by the end user live.

In this embodiment of the invention, the system and method may be employed for authorizing an individual instance of use of a software application, wherein use is intended here to refer to the possibility of any of download, play or use, as well as for the authentication or authorization for release of a software application for future use under agreed license terms.

This embodiment of the invention operates as already described with reference to FIGS. 1 to 8, and when the end user 100 wishes to request a particular software application, a process as previously described with reference to FIG. 4 is executed:

(1) The end user 100 selects the software application from the public domain or from a universal resource locator (URL) and obtains its software application ID, comprising an alphanumeric string representing the name for the selected item. The end user 100 then dispatches a request for the particular software application by way of the network operator 200 to the authentication system 500, for validation of the request.

(2) Following receipt of the software application request from the end user 100, the authentication system 500 first validates the request and then locates the software application reference or network address in the metadata register 524. If the request is successfully validated, the authentication system 500 generates a unique HashValue and software application release key. The authentication system 500 then sends a message back to the end user 100 including the software application reference, the unique HashValue and the release key.

(3) On receipt of the software application reference, the end user 100 issues a demand for the software application, including the unique HashValue and the software application reference.

(4) The network operator 200 captures the demand and validates the HashValue with the authentication system 500, which issues a new release key and adds this new release key to the security container 522 in association with the HashValue. The authentication system 500 sends a message with the unique HashValue and the new release key back to the network operator 200.

(5) Thereafter, the network operator 200 passes the demand on to the software application supplier 300, 400 together with the software application reference and the unique HashValue.

(6) The software application supplier 300, 400 likewise validates the unique HashValue with the authentication system 500 in the same way, and the authentication system 500 issues another new release key and adds this further new release key to the security container 522 in association with the HashValue. The authentication system then sends back a validation message with the HashValue and the still further release key.

(7) Finally, the software application supplier 300, 400 releases the selected software application to the end user 100 for download and thereafter for play or use, or for play or use if the application is already downloaded, or for play or use by means of streaming and/or for play or use employing cloud computing.

Figure 9A:
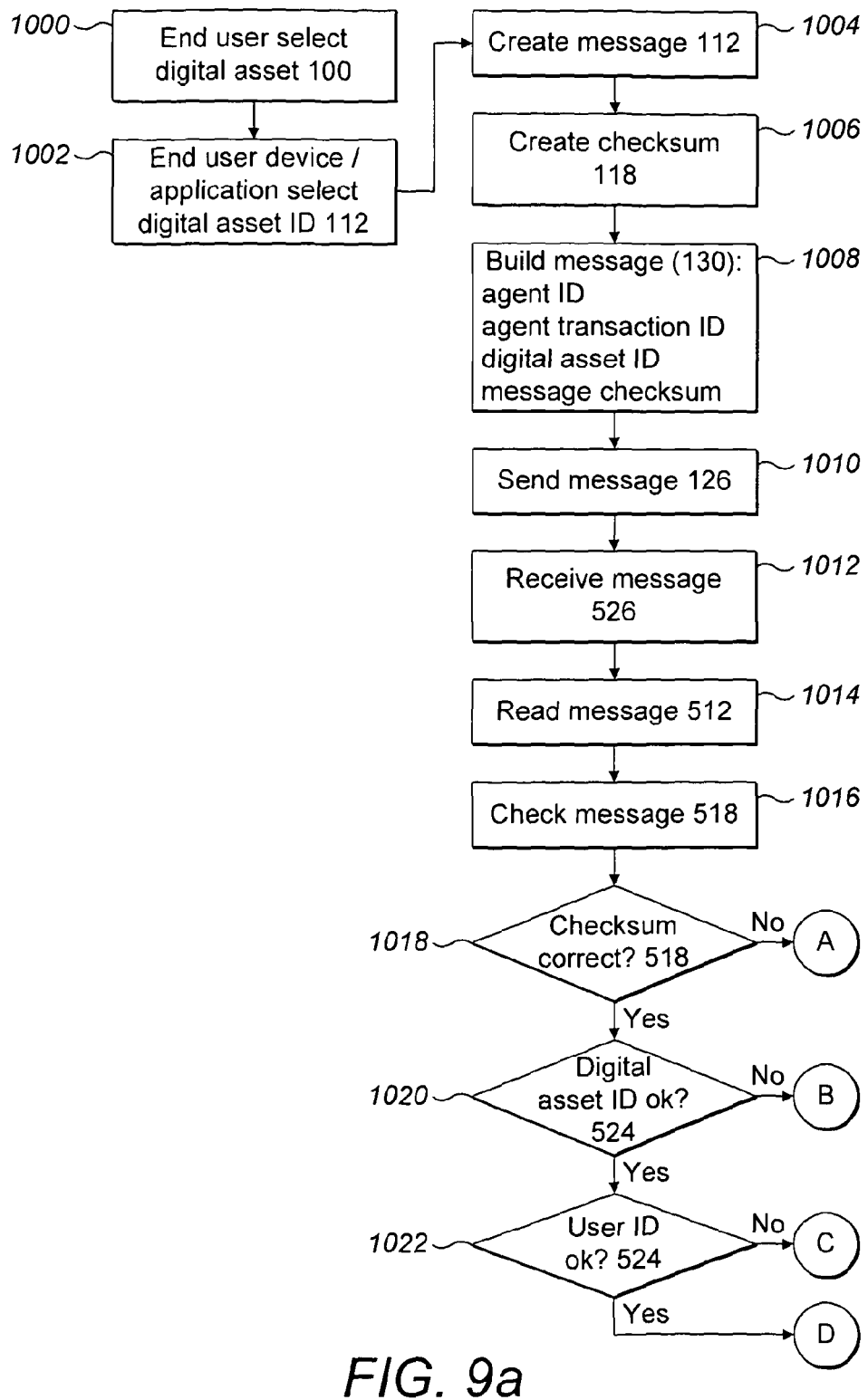
FIGS. 9a and 9b together comprise a flow chart of the initial steps involved in validating a digital asset request according to the invention.
Figure 9B:
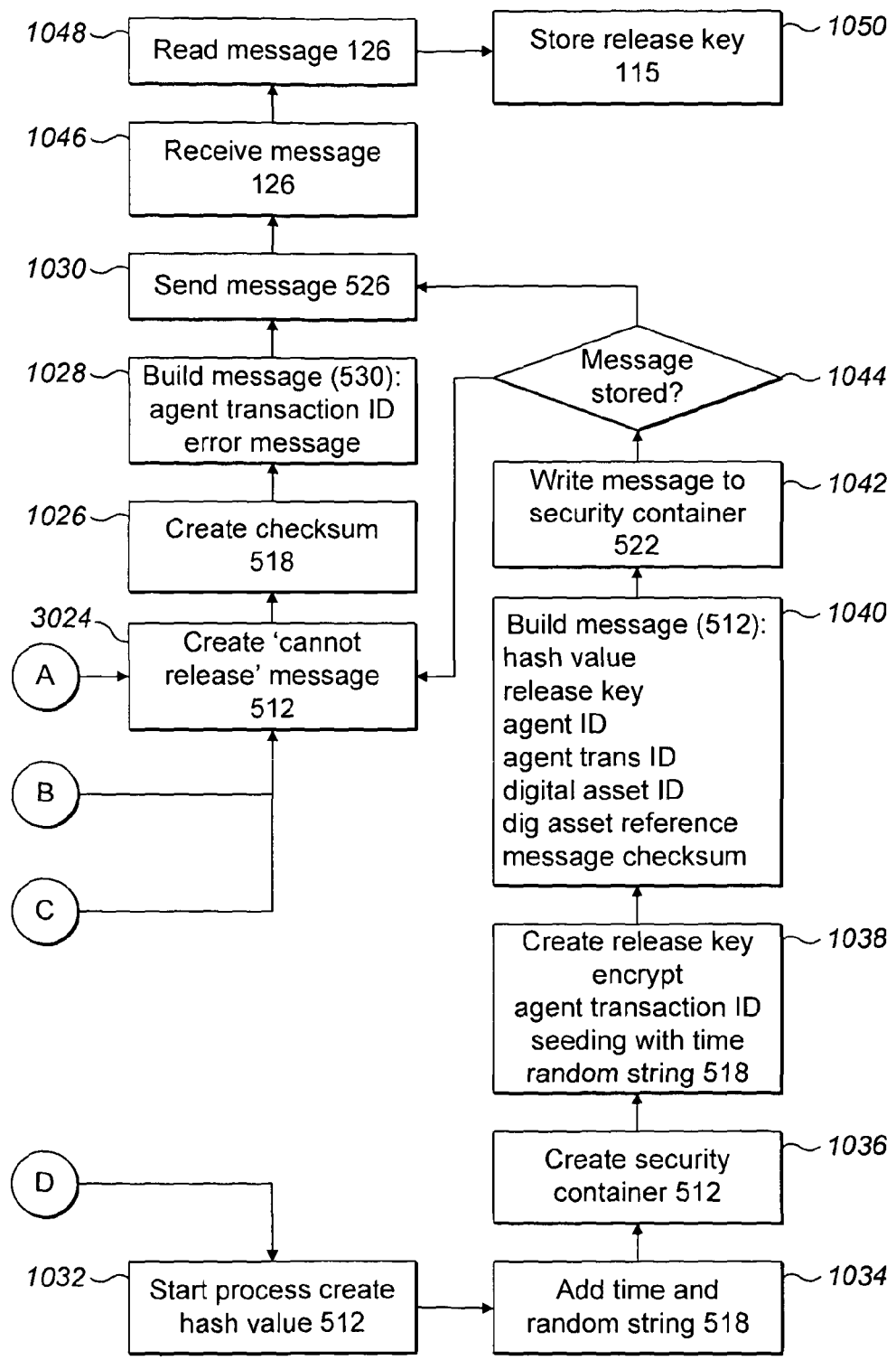
Figure 10A:
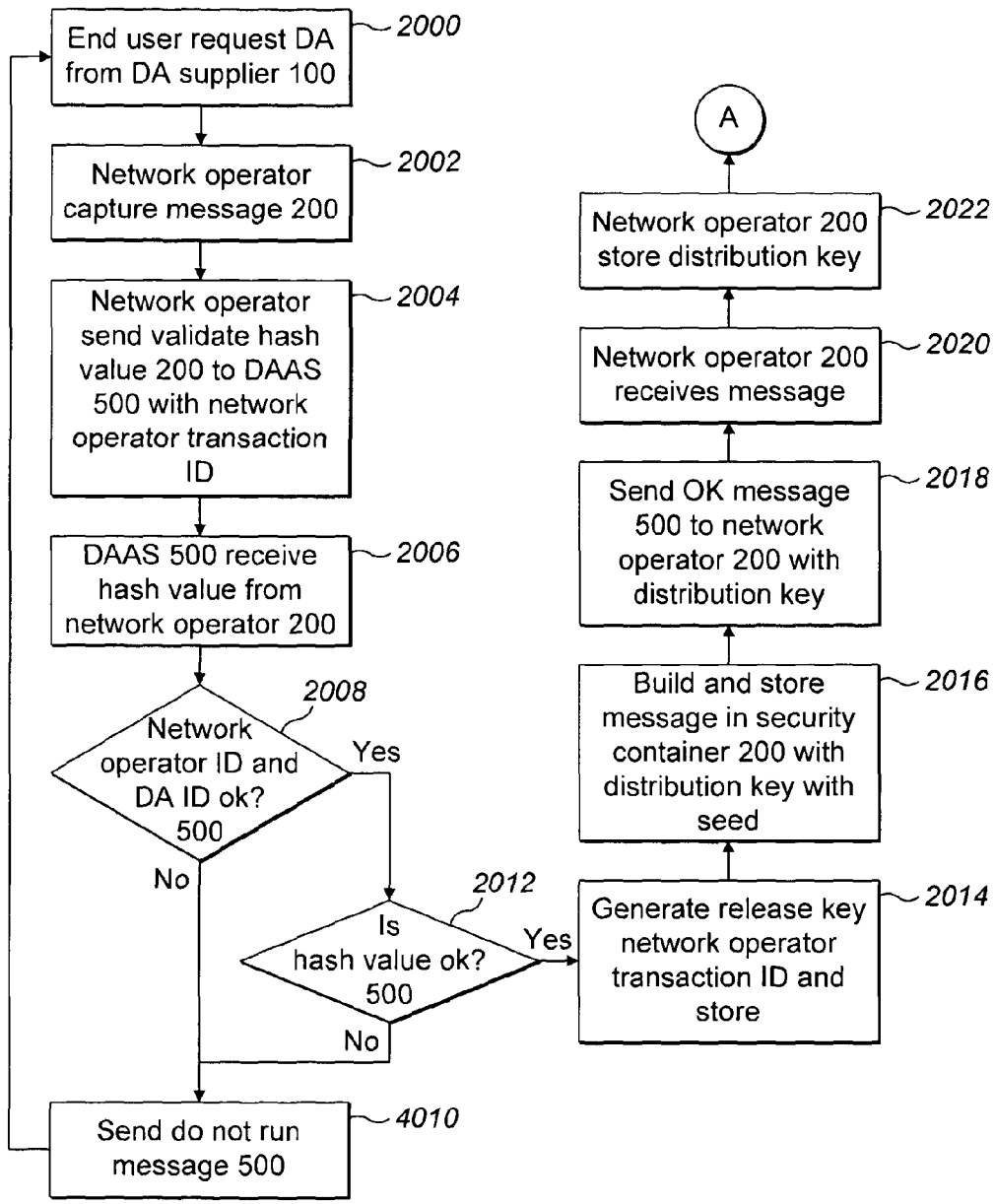
FIGS. 10a and 10b together comprise a flow chart of the steps involved in releasing a digital asset according a further embodiment of the invention.
Figure 10B:
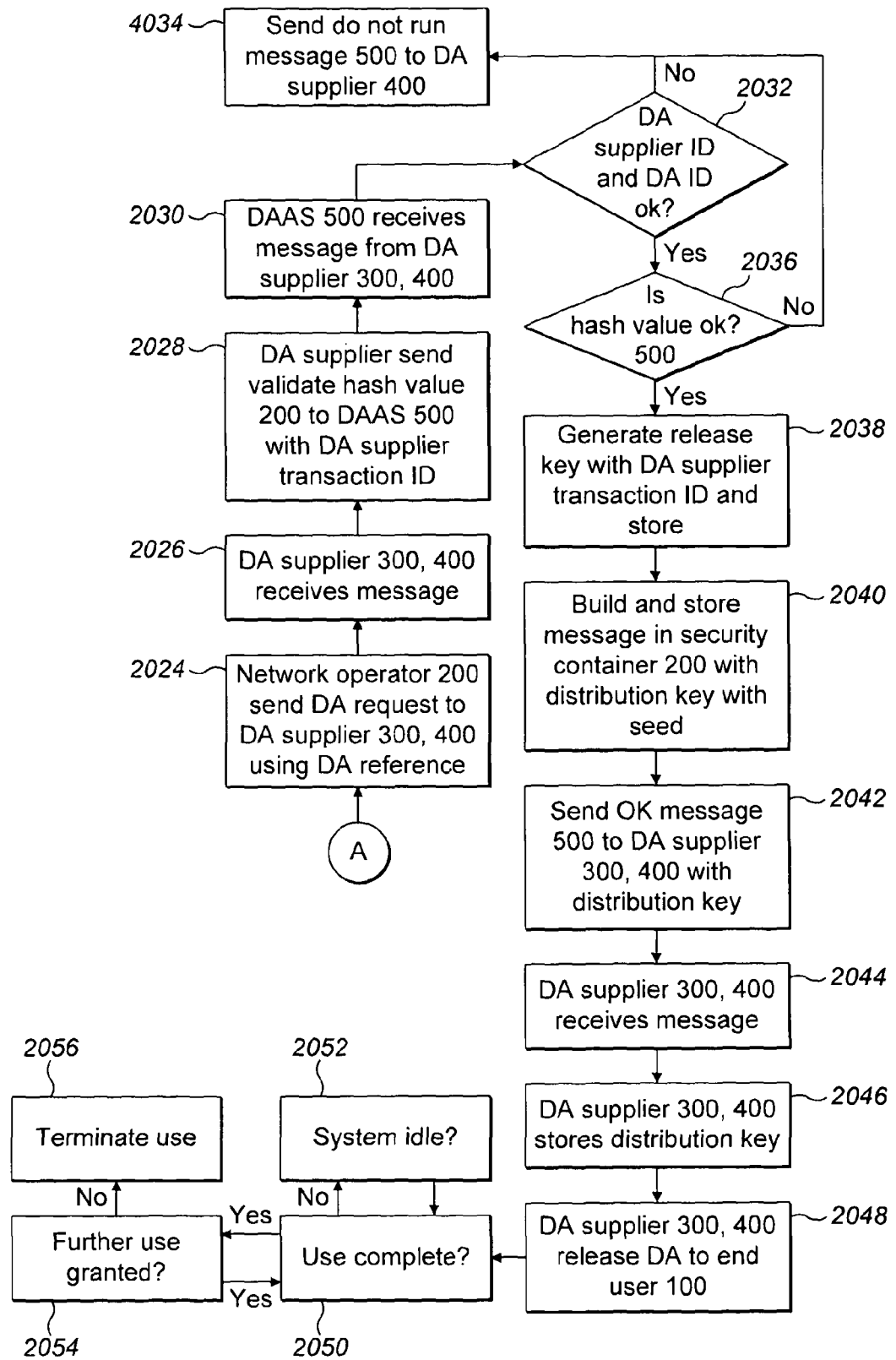

Thus far, this embodiment is similar to the embodiment already described. However the further embodiment may, instead or in addition, include some further aspects, which will now be described with reference to FIGS. 9a, 9b, 10a and 10b, together comprising flow charts of the steps involved in validating and releasing a digital asset, comprising a software application, according to the invention. FIGS. 9a and 9b respectively correspond with FIGS. 5a and 5b, and FIGS. 10a and 10b respectively correspond with FIGS. 7a and 7b, and the same reference numerals are employed for the same steps. Such similar steps will not described further, since reference for these may be had to the description of FIGS. 5a, 5b, 7a and 7b. Some of the original steps have, however, been modified and only these new steps will now be described.

The first modification concerns step 1024, which follows if the outcome to the enquiry in step 1018 as to whether the checksum is correct is no, or if the outcome of step 1020 indicates that the software application ID has not been located in the metadata register 524, or if the outcome of the enquiry in step 1022 as to whether the software application is available to the end user is a no. In this embodiment, when any one or more of the checksum, the software application ID and the end user ID do not tally, the authentication software 520 in step 3024 generates a 'cannot release' message, adding the end user ID and the end user transaction reference. Then the authentication software 520 creates an associated checksum in step 1026 and builds an instruction in step 1028, including the end user ID, the end user transaction reference, the 'cannot release' message and the checksum. Such message is transmitted over connection 526 by way of network interface module 530 back to the end user 100 in step 1030.

The next modification concerns step 2010, which in the initial embodiment relates to sending an error message if one of two conditions prevail. In the present embodiment, if the authentication system 500 on making reference to the metadata register 524 is informed that one of the network operator ID and the software application ID is not valid, then the authentication system 500 proceeds to step 4010 and returns a 'do not run' message. Likewise, if, in step 2012 when the authentication system 500 verifies the unique HashValue, the outcome of this enquiry is that the HashValue has been compromised in some way and is not valid, again the system proceeds to step 4010 and returns a 'do not run' message.

Similarly, when the authentication system 500 performs the verification in step 2032 that the digital supplier ID and the software application ID are valid, making reference to the metadata register 524 for this purpose, the authentication system 500 will return a 'do not run' message in step 4034 in the event that at least one of these IDs is not validated. Again, the authentication system 500 will return a 'do not run' message in response to the outcome of step 2036 in which the HashValue is verified, in the event that the HashValue has been compromised.

In each case, the 'do not run' message is transmitted back to the software application supplier 300, 400 and the selected software application is not released to the end user.

On the other hand, assuming that the steps shown in FIGS. 9a, 9b, 10a and 10b have successfully led to the release of the software application in step 2048, the authentication system will proceed to step 2050 and check whether a predetermined instance of use has been completed. If not, the authentication system will idle in step 2052 and will then revert to step 2050 at some predetermined future time. If the instance of use has been completed, however, the authentication system will check in step 2054 whether a further request for the software application has been issued by the end user and has been granted. If yes, the authentication system will revert to step 2050 and check whether the next predetermined instance of use has been completed. If no, the authentication system will proceed to step 2056 and terminate use of the software application.

In this embodiment, the digital asset supplier 300, 400 will again initiate regularly a reconciliation process, as shown in FIG. 8, in order to track the number of instances of use of the software application that have been authorized. The authentication system 500 will then searches all the security containers in the security container store 522 for all the release keys issued to the end user 100, the network operator 200, and the digital asset supplier 300, 400 for that specific software application ID during the specified period, as before.

The invention claimed is:

1. A digital asset authentication system comprising:
a digital asset metadata register storing details of parties enrolled with the system, including at least one end user and at least one digital asset supplier, and details of digital assets available from the at least one digital asset supplier;
a security module comprising instructions in non-transitory memory and executable by a processor for producing a unique tag and for creating a digital asset security container for the tag comprising data relating to events involving the tag, wherein the tag comprises a random string and an associated time value;
a store for the tag and the security container;
an authentication application; and
the processor further configured for executing the authentication application to perform the following steps:
in response to a request from said at least one end user for a respective digital asset to validate the request by reference to the metadata register to verify that the metadata register lists said at least one end user and the respective digital asset,
in response to a request which has been validated by reference to the metadata register, firstly to cause the security module to produce the tag and to create the security container initially containing data relating to the at least one end user, a transaction reference and the digital asset in association with said tag, secondly to issue an end user authorization message including the tag to said at least one end user, and thirdly generating a respective release key by encrypting the respective transaction reference and causing the security module to seed the encrypted transaction reference with a new random string and a new associated time value,
in response to a demand for the digital asset from said at least one end user, which demand includes said tag, to validate the demand with said at least one digital asset supplier by reference to the digital asset metadata register to verify that the metadata register lists said at least one digital asset supplier and the respective digital asset and by verifying said tag with the security container, and
in response to a validated demand firstly to update the security container with data relating to the at least one digital asset supplier, a further transaction reference and the digital asset in association with said tag and secondly to generate a validation message for said at least one end user authorizing release of said digital asset for download, play or use.

2. The digital asset authentication system according to claim 1 wherein the security module includes a random value generator and a clock facility and wherein the unique tag produced by the security module comprises a random string and an associated time value.

3. The digital asset authentication system according to claim 1 wherein the message associated with the respective transaction reference includes said respective release key.

4. The digital asset authentication system according to claim 1 wherein said processor is further adapted for executing the authentication application to store said respective release key in said security container in association with the tag.

5. The digital asset authentication system according to claim 1 wherein said processor is further adapted for executing the authentication application to validate the demand by verifying said tag with the security container and to pass the validated demand including said tag to said at least one digital asset supplier, and to monitor and validate a reply including said tag from said at least one digital asset supplier by reference to the digital asset metadata register to verify that the metadata register lists said at least one digital asset supplier and by again verifying said tag with the security container.

6. The digital asset authentication system according to claim 1 wherein said validation message for said at least one end user includes a digital asset reference identifying a network address for said at least one digital asset supplier, from which network address said digital asset may be obtained.

7. The digital asset authentication system according to claim 6 wherein said processor is further adapted for executing the authentication application in response to said demand from said one at least end user for the respective digital asset, which demand is supplied via another party for authentication, to validate the demand and add the demand to the security container and to generate said validation message for said another party including the tag and a demand validation.

8. The digital asset authentication system according to claim 1 further including digital asset authentication apparatus and a network operator, wherein said digital asset authentication apparatus includes said digital asset metadata register, said security module, said store, said authentication application, and said processor, and wherein said parties including said at least one end user and said at least one digital asset supplier are in communication with one another and with said digital asset authentication apparatus by way of said network operator.

9. The digital asset authentication system according to claim 1 further including digital asset authentication apparatus and a network operator, wherein said digital asset authentication apparatus includes said digital asset metadata register, said security module, said store, said authentication application, and said processor, and wherein said parties including said at least one end user and said at least one digital asset supplier are in communication with one another by way of said network operator and said digital asset authentication apparatus.

10. The digital asset authentication system according to claim 1 wherein said processor is further adapted for executing the authentication application in response to a reconciliation request relating to a respective said digital asset from an enrolled said party to search the security container store for release keys issued for that digital asset and to supply to said enrolled party a list of the release keys located in the search.

11. The digital asset authentication system according to claim 1 wherein the digital asset comprises a software application, and wherein the said message authorizes the at least one end user to run the software application.

12. The digital asset authentication system according to claim 9 wherein the authentication application includes means executable after an individual instance of use of the software application for preventing or inhibiting further use of the software application except in response to a further request from the at least one end user for the software application.

13. A method for digital asset authentication comprising:
storing in a metadata register details of parties enrolled for digital asset transactions, including at least one end user and at least one digital asset supplier, and details of digital assets available from the at least one digital asset supplier;
in response to a request from said at least one end user for a respective digital asset validating the request by reference to the metadata register to verify that the metadata register lists said at least one end user and the respective digital asset;
in response to a request which has been validated by reference to the metadata register, firstly producing a unique tag and creating a security container for the tag comprising data relating to events involving the tag, wherein producing said unique tag comprises generating a random string employing a random value generator and adding an associated time value, the security container initially containing data relating to the at least one end user, a transaction reference and the digital asset in association with said tag, secondly issuing to said at least one end user an end user authorization message including the tag, and thirdly generating a respective release key by encrypting the respective transaction reference and by seeding the encrypted transaction reference with a new random string and a new associated time value;
in response to a demand for the digital asset from said at least one end user, which demand includes said tag, validating the demand with said at least one digital asset supplier by reference to the digital asset metadata register to verify that the metadata register lists said at least one digital asset supplier and the respective digital asset and by reference to the security container to verify said tag, and
in response to a validated demand firstly updating the security container with data relating to the at least one digital asset supplier, a further transaction reference and the digital asset in association with said tag and secondly generating a validation message for said at least one end user authorizing release of said digital asset for download, play or use.

14. The method according to claim 13 comprising including said respective release key in said message associated with the respective transaction reference.

15. The method according to claim 13 comprising storing said respective release key in said security container in association with the tag.

16. The method according to claim 13 comprising validating the demand by verifying said tag with the security container and passing the validated demand including said tag to said at least one digital asset supplier, and monitoring and validating a reply including said tag from said at least one digital asset supplier by reference to the digital asset metadata register to verify that the metadata register lists said at least one digital asset supplier and by again verifying said tag with the security container.

17. The method according to claim 13 comprising identifying a network address for said one digital asset supplier, from which network address said digital asset may be obtained, and including a digital asset reference identifying said network address in said validation message for said at least one end user.

18. The method according to claim 17 wherein in response to said demand from said at least one end user, which demand is supplied via another party for authentication, validating the demand, adding the demand to the security container and generating said validation message for said another party including the tag and a demand validation.

19. The method according to claim 13 wherein said parties including said at least one end user and said at least one digital asset supplier are in communication with one another and with a digital asset authentication apparatus by way of a network operator.

20. The method according to claim 13 wherein said parties including said at least one end user and said at least one digital asset supplier are in communication with one another by way of said network operator and a digital asset authentication apparatus.

21. The method according to claim 13 comprising, in response to a reconciliation request relating to a respective digital asset from an enrolled said party, searching the security container store for release keys issued for that digital asset, and supplying to said enrolled party a list of the release keys located in the search.

22. The method according to claim 13 wherein the digital asset comprises a software application, and comprising authorizing the at least one end user to run the software application.

23. The method according to claim 13 further comprising after an individual instance of use of the software application inhibiting further use of the software application except in response to a further request from the end user for the software application.

* * * * *